United States Patent [19]

Daw

[11] Patent Number: 4,667,579
[45] Date of Patent: May 26, 1987

[54] CLEANROOM STRUCTURE

[75] Inventor: Terry L. Daw, Salt Lake City, Utah

[73] Assignee: Daw, Incorporated, Salt Lake City, Utah

[21] Appl. No.: 783,789

[22] Filed: Oct. 3, 1985

[51] Int. Cl.⁴ .............................................. F24F 7/10
[52] U.S. Cl. ..................................... 98/33.1; 52/79.1; 52/509
[58] Field of Search ...................... 52/79.1, 79.13, 272, 52/284, 285, 509; 98/31.5, 31.6, 33.1, 34.5, 34.6, 40.1; 55/385 A

[56] References Cited

U.S. PATENT DOCUMENTS

| | | | |
|---|---|---|---|
| 3,158,457 | 11/1964 | Whitfield | 55/472 |
| 3,252,400 | 5/1966 | Madl, Jr. | 98/33.1 |
| 4,409,889 | 10/1983 | Burleson | 98/31.5 |
| 4,506,595 | 3/1985 | Roberts et al. | 98/31.5 X |
| 4,554,766 | 11/1985 | Ziemer et al. | 98/33.1 X |
| 4,608,066 | 8/1986 | Cadwell, Jr. | 98/40.1 X |

Primary Examiner—Harold Joyce
Attorney, Agent, or Firm—Thorpe, North & Western

[57] ABSTRACT

An industrial cleanroom structure including a plenum enclosure assembly positioned above a cleanroom enclosure assembly. The plenum assembly includes plenum support structure rigidly attached and including top and bottom covers and sidewall covers sealed to prevent entry of microcontamination into the plenum enclosure. The plenum top cover includes openings for receiving air propelled by overhead fans into the plenum area. The plenum bottom cover comprises a filter system through which air is expelled into the cleanroom enclosure. The cleanroom enclosure includes a plurality of fabricated wall studs removably attached to the plenum support structure in vertical orientation to form wall support structure having exact vertical and horizontal alignment. At least one horizontal span cord is coupled to the plenum support structure and indirectly to the wall support structure to rigidly tie all coupled studs together in load sharing relationship.

41 Claims, 6 Drawing Figures

CLEANROOM STRUCTURE

BACKGROUND OF THE INVENTION

1. Field of Invention

This invention pertains to an industrial structure constructed to meet cleanroom specifications such as are required for the production of integrated circuit chips, electronic components and other products which are subject to contamination in an environment of dust or other forms of microcontamination. More particularly, the present invention relates to modular construction for a cleanroom wherein the enclosing structure can be assembled or disassembled in components, and wherein the assembled cleanroom structure can be modified by removal of structural elements without affecting the cleanroom certification for remaining, unchanged structure.

2. Prior Art

The advance of modern technology into the world of miniaturization has necessitated the development of unique manufacturing environments. For example, the preparation of a multilayered, integrated computer chip includes the fabrication of wafer masks and layouts that include hundreds of tiny circuits whose operational condition depends upon the absence of foreign materials. These chips are prepared in an industrial cleanroom which is classified based upon the amount of microcontamination within the room. A Class 100 room at 0.5 microns means that a cubic foot of controlled airspace within the cleanroom will have no more than an average total of 100 particles no larger in size than 0.5 microns. Likewise, a Class 10 room means that there are only 10 or less particles of 0.5 microns in size or larger in a cubic foot of airspace.

The trends for increased productivity and chip capacity have increased the need for more stringent standards for cleanroom structures. Movements have developed to reduce the standard of measurement from 0.5 microns to 0.2 microns and to anticipate Class 1 cleanroom conditions. Research efforts to reach these goals have focused on development of filter systems which operate to remove microcontamination greater than the prescribed size from circulating air. Flanders Filters, Inc., for example, has developed HEPA filters which establish a Class 10 condition based on 0.1 micron particle size. More controlled environments are being realized with a cleanroom by setting up individual hooded work stations where increased filter action is applied to a greatly reduced workspace of several cubic yards. Efforts are also being made to improve the airflow pattern to reduce turbulence, which tends to accumulate pockets of dust and other forms of contamination.

The realization of improved cleanroom requires special attention to room construction as well as air filter systems. As the Class 1 condition is approached, focus must extend to both filter system and room-tight construction features. Because of the need for rigid, air tight construction, typical cleanroom facilities are permanent structures. Structural modifications to change wall position, room access or design are difficult and sometimes impractical because other joints and seams at wall junctions, windows, doors, ceiling, etc., may be affected. Shifting a segment of wall may cause a slight movement in another wall section. This slight movement may be undetectable to the eye; however, it could be a wide-open door to microcontamination. This results in extended down-time and certification expense.

Although permenant structures were acceptable for earlier cleanrooms, modern industry demands greater structural adaptability. Many of these demands are not only a natural outgrowth of the changing technology in wafer production, but also include longstanding design problems unique to cleanroom production. For example, manufacturing equipment used within the cleanroom may require day to day maintenance. To protect the cleanroom environment, the equipment is typically installed as part of a service wall with the operational side sealed to the interior of the cleanroom and the maintenance/access side exposed to a service aisle adajacent the cleanroom. Although repair work is facilitated by the service wall configuration, removal of machinery may involve modification to wall structure. Therefore, if equipment must be replaced, risk of damage to the cleanroom structure exists. Equally challenging is the need for an adapted wall structure which allows modification in configuration to permit change to new equipment as the industry progresses. With present facilities such progressive changes in equipment may require construction of a new cleanroom facility, particularly where major remodeling of the loadbearing wall structure is required. Such structural limitations illustrate the distinction of cleanroom structures from facilities not subject to such severe limitations.

Further uniqueness of the cleanroom as a separate field of art as compared to general construction is evident in the modern trend toward use of overhead plenum/filter air purification systems. The plenum is usually constructed in an overhead position with a full suspended ceiling utilizing a HEPA filter system. Large airconditioning units are supported over the plenum structure and force the air into the plenum volume. This plenum must be a fully sealed, rigid structure to preserve strict cleanroom conditions. Attempts to remove wall structure below this heavy plenum for replacement of equipment can not only breach the cleanroom condition of the wall enclosure, but can also compromise the certification of the plenum as well.

The financial impact of a nonoperational or defective cleanroom is staggering. For example, the production cost for a sheet of wafers or computer chips is the same, regardless of the percent of wafers that are acceptable. If only 10% of the batch are usable because 90% are contaminated due to loss of cleanroom condition, the production cost can far exceed potential sales receipts. In a premium cleanroom environment, however, the same production cost can develop a 50 to 75% yield. Economical productivity in the wafer industry is therefore a direct function of cleanroom serviceability.

Because of the high risk and critical impact of microcontamination in chip manufacturing, prior art cleanroom structures have been fabricated in accordance with permenant design features, as opposed to temporary or modular construction. Specific parts of walls are either designed for permanent loadbearing function or service wall access and are not adapted to be interchangable. The development of a portable, modular cleanroom enclosure has been deemed impractical for meeting the stringent needs of future class 1 structural requirements.

OBJECTS AND SUMMARY OF THE INVENTION

It is an object of the present invention to provide an industrial structure useful as a cleanroom enclosure which provides wall support structure which can be removed or replaced without compromising the remaining wall structure, plenum structure or other parts of the cleanroom.

It is a further object of the present invention to provide a cleanroom structure having a service wall made up of modular components which can be quickly removed to allow replacement of cleanroom equipment or insertion of additional cleanroom equipment through the service wall.

It is a still further object of this invention to provide wall support structure which is load-bearing, yet can be removed without affecting the remaining load-bearing structure.

Yet another object of this invention is to provide a modular cleanroom structure which can be quickly assembled and disassembled and includes modular wall studs, wall panels and other structural components.

It is a further object of this invention to provide a cleanroom structure having an overhead plenum which feeds filtered air into a subordinate cleanroom structure, the combination being modular in design and subject to disassembly and reassembly into a different structural configuration.

An additional object of this invention is to provide structural components including wall panels, panel clips for wall studs and ceiling elements to seal all modular components in an assembled, isolated configuration for Class 1 cleanroom performance.

A still further object of this invention is to provide a cleanroom structure which includes a surrounding cleanroom wall structure capable of being disassembled throughout its full circumference based upon individual removal and reattachment of each modular component.

These and other objects are realized in a cleanroom enclosure which has at least one service wall adjacent to an exterior service aisle wherein industrial equipment is mounted through the service wall for use in the cleanroom environment. This cleanroom includes a plenum enclosure positioned above the cleanroom and formed between top and bottom covers. The bottom cover of the plenum enclosure includes a microfilter system which communicates to the cleanroom enclosure and filters out microcontamination from air being expelled through the filter system into the cleanroom environment. The plenum includes support structure rigidly attached to the top and bottom covers and to the sidewalls of the plenum to fix the respective sidewalls and covers in relative immovable position around the plenum enclosure. Each cover is sealed to prevent entry of contamination. The plenum structure further includes several openings for receiving air from a fan or air conditioning system for delivery into the plenum enclosure.

The cleanroom is formed below the plenum by a plurality of fabricated wall studs which are removably attached to the plenum support structure in vertical orientation, forming cleanroom wall support structure. This wall structure includes a plurality of removable, horizontal braces between each respective pair of wall studs to fix their relative position and provide lateral distribution of load into the wall stud structure. The cleanroom further includes at least one horizontal span cord which is coupled to the plenum support structure adjacent the service aisle. The wall structure of the cleanroom adjacent the service aisle is also structurally coupled to the span cord to rigidly tie all of the coupled studs together as load sharing stud members. These stud members bear the load distributed from the plenum support structure through the span cord. Each stud coupled to the span cord has sufficient column strength to support its own distributed portion of the plenum load, as well as that portion of the load normally distributed to two adjacent studs.

In accordance with the present invention, the wall structure adjacent the service aisle is capable of having at least one of its stud members removed and later reinstalled at any time after certification as cleanroom qualified. Such removal and reinstallation can be made without causing a significant displacement or adverse weakening of the remaining industrial structure which would compromise its cleanroom certification. Wall panels are removably attached to the wall support structure to fully enclose the cleanroom and are sealed around their perifery to prevent entry of microcontamination. These panels are adapted in size and configuration to allow removal and reinsertion or replacement with other wall panels which provide a tight periferal fit adapted for sealing between the attached panels and any inserted cleanroom equipment.

Means for venting air from the cleanroom to enable continuous circulation of clean air from the plenum is also provided. Typically, such venting means shall be positioned near the floor of the cleanroom and will extend around the periferal edge of the cleanroom area.

The wall studs of the cleanroom assembly may include a vertical reference oriented along a column of slotted openings in the face of each stud. Panel clips are inserted within the slotted openings and provide the means for mounting the wall panels and other coverings to the supporting stud members. A unique clip design is illustrated in combination with means for sealing the panels at the wall studs with a double sealed barrier.

The cleanroom structure provided by this invention has developed cleanroom environments exceeding a Class 1 status, while offering flexibility for modular changes and structural adaptations for changing equipment, cleanroom shapes and meeting other demands.

Other objects and benefits of the present invention will be apparent from the following detailed description, taken in connection with the included drawings.

DETAILED DESCRIPTION OF THE INVENTION

Figure 1:
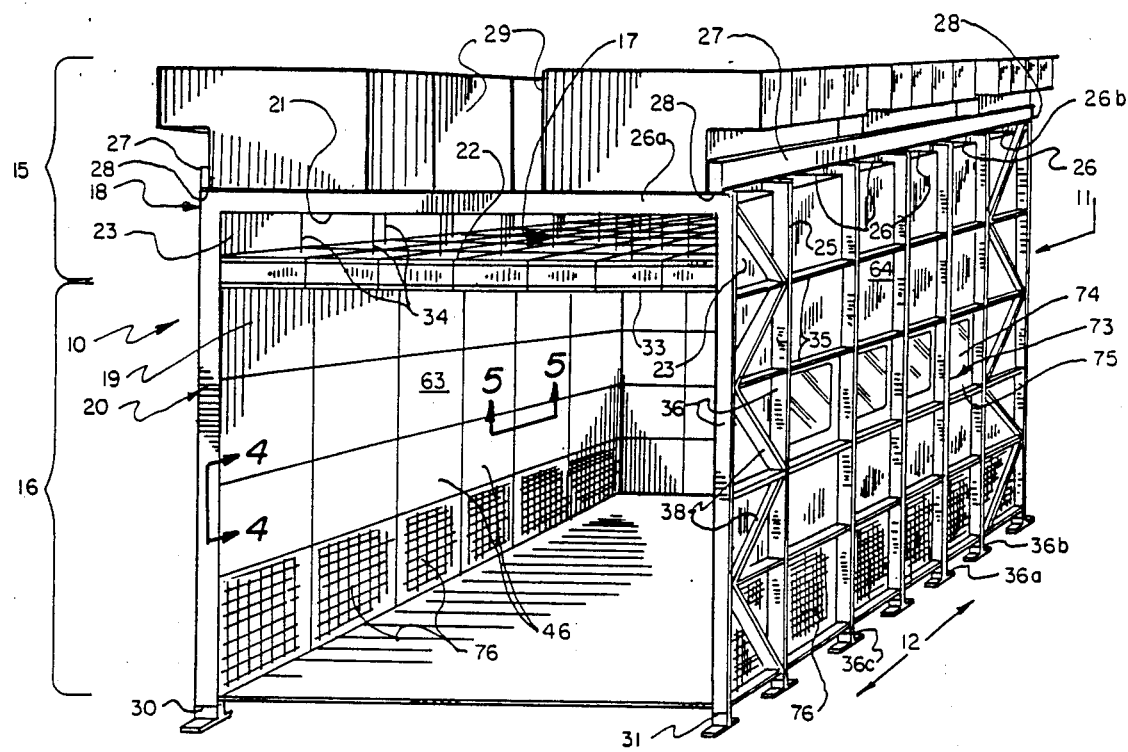
FIG. 1 shows a perspective view of an industrial structure for a cleanroom in accordance with the present invention, the front wall of the cleanroom having been deleted to show the interior room structure.
Figure 3:
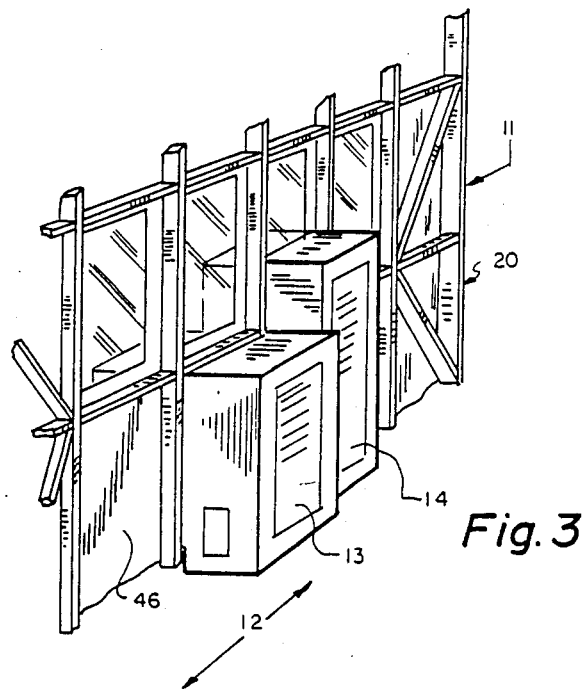
FIG. 3 is a perspective view of the service wall portion of FIGS. 1 and 2, showing the equipment inserted through the service wall and appropriately sealed for cleanroom condition.

An industrial cleanroom structure constructed in accordance with the present invention is shown generally as Item 10 in FIG. 1. The cleanroom includes a service wall 11 shown in the right side of the figure which is proximate to an exterior service aisle 12 which constitutes a walkway for access to the exterior side of the service wall 11. As has been previously explained, the service aisle provides a location for mounting industrial equipment with operational access to the interior of the cleanroom and maintenance access to the exterior of the equipment exposed through the service wall 11 to the service aisle 12. FIG. 3 illustrates actual positioning of service equipment 13 and 14 along the service wall.

The preferred structural configuration of the present invention comprises a plenum assembly 15 and cleanroom assembly 16. The plenum assembly includes a plenum enclosure 17 surrounded by plenum support structure 18. The cleanroom assembly comprises the cleanroom enclosure 19 and wall support structure 20.

The plenum enclosure 17 is positioned above the cleanroom enclosure 19 and is formed between top 21 and bottom 22 covers. Sidewall covers 23 enclose the perifery of the plenum enclosure 17. This enclosure covering is attached to plenum support structure which includes the various vertical 25 and horizontal 26 support studs.

Specifically, the plenum support structure is formed of a plurality of horizontal, parallel, elongated support members 26 which are attached to and joined together by two horizontal span cords 27. As can be noted from the drawings, these span cords 27 are positioned perendicular to the horizontal support members 26 and near the opposing sides 30 and 31 of the cleanroom. The respective points of attachment 28 may be welded or bolted, as long as the connection is rigid and secure. This combination of horizontal support members 26 and attached span cords 27 forms an overhead support grid to which the top cover 21 is attached. Furthermore, this support grid bears the load of the heavy air conditioning units or fans 29 positioned over the plenum area.

The sidewall cover 23 is attached to a plurality of side panel support studs 25. These side panel support studs 25 are coupled vertically to the support grid by welded or bolted connection. As with the horizontal support members 26, the vertical support studs are equally spaced as viewed along common lateral directions and collectively form a sidewall plenum support grid. This grid provides the structural support for attachment of removable panels 23 which constitute the sidewall covering for the plenum. Likewise, the horizontal support members 26 provide attachment support to removable panels forming the top cover 21. Ideally, the means for attaching these respective panels enable ready release so that the plenum can be assembled or disassembled as needed. By maintaining approximate equal separation distances between the horizontal and side panel studs, a single plenum cover panel may be used to totally enclose the top and side walls. A description of the panel and means for releasable attachment to the support structure is disclosed hereafter.

The primary function of the support grid is to provide load distribution throughout the horizontal support members 26 and evenly around the supporting wall structure 20. From this perspective, the overhead support grid comprises a plurality of support members 26 joined together by the pair of perpendicular span cords 27 to form a rectangular support perimeter for suspending the wall structure 20 therebelow. Accordingly, the weight of the air conditioning units 29, along with the support grid weight are transferred into the rectangular support perimeter which is formed from the span cords 27 and outer support members 26a and 26b. The plenum sidewall 23 and sidewall support studs 25 are coupled below the support perimeter as previously indicated.

The bottom cover 22 of the plenum enclosure comprises a microfilter system which is generally referred to in the industry as a HEPA ceiling filter system. This system is made up of modular components 32 which are set in a framework 33 or support grid which seals the perifery of each inserted member 32 to prevent entry of air from the plenum enclosure 17 into the cleanroom enclosure, except by way of the HEPA filter system. The ceiling support members 33 are shown coupled to the support grid via suspension rods or cords 34. As has been stated, the HEPA filter system functions to filter out microcontamination from air being expelled through the filter system into the cleanroom from the plenum.

This air is pumped from the overhead fans or air conditioning units 29 through openings in the top cover (not shown) to establish positive pressure flow from the plenum into the cleanroom enclosure. Because all side panels and wall perimeters are sealed, all air must enter through the fans 29 and can only exit the plenum enclosure through the HEPA filter units 32. Although the air openings into the plenum are described as being through the top cover, it will be apparent to those skilled in the art that such openings could likewise be through the sidewall cover 23.

The plenum assembly 15 therefore represents an integral structural assembly which is rigidly and tightly fixed together, but is made up of modular units which can be assembled or disassembled as needed. In its fully assembled form, it is fully sealed except for the inlet openings (not shown) communicating from the fans into the plenum enclosure, and the HEPA filter members which allow air movement through the ceiling at a substantially uniform rate, thereby establishing a laminar flow front of minimum turbulence. This laminar flow operates to sweep internally generated particles out of the cleanroom.

The integrated and rigidly connected structure provides distribution of load throughout the supporting wall structure therebelow. This structural integrity is primarily developed by the span cords 27 which couple the supporting structure into a single support grid or matrix. Accordingly, the total plenum support structure can be viewed as a support matrix to which side and top panel covers are attached, the ceiling being suspended from the support grid.

The cleanroom assembly 16 is formed below the plenum and consists of a plurality of fabricated wall studs 36 which are removably attached to the plenum support structure in vertical orientation to form wall support structure 20 below the plenum and around the cleanroom enclosure. These wall studs 36 are removably attached directly or indirectly into the superior span cords 27 to rigidly tie all of the coupled studs 36 together as load sharing stud members. This provides for transfer of the total plenum weight through the span cord and into the respective stud members. Horizontal braces 35 are removable coupled between vertical studs 36 to further stabilize the wall support structure and develop lateral transfer of load.

Each stud 36 has sufficient column strength to support its own distributed portion of the plenum load, as well as support that portion of the load which would normally be distributed to the two adjacent studs when all wall studs are in place. For example, stud 36a has sufficient strength to bear its own portion of the plenum load, plus sufficient additional strength to bear the load carried by studs 36b and 36c. Accordingly, these studs could be removed without a shift or damaging structural change to the wall structure anywhere under the plenum assembly. This feature is significant because it permits removal of segments of wall structure without adversely affecting the remaining parts of the cleanroom 10.

Figure 2:
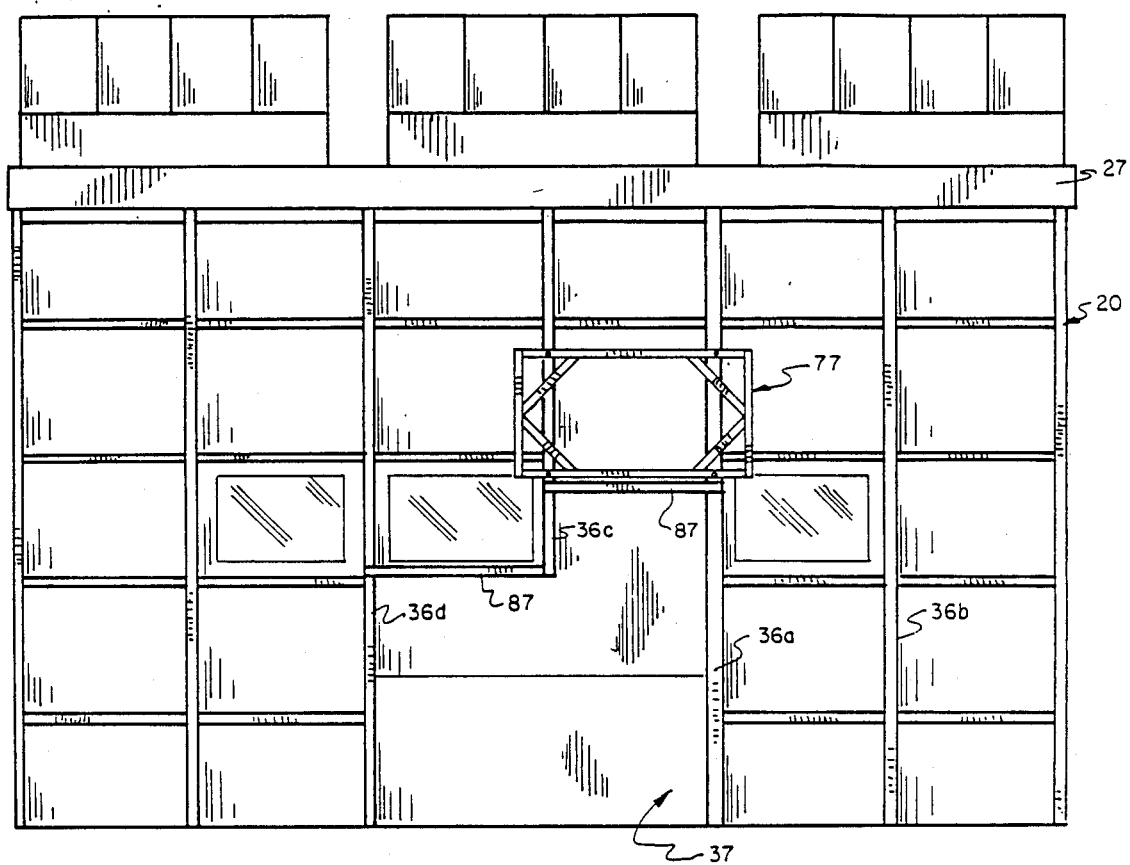
FIG. 2 represents a side view of the structure of FIG. 1 with the portion of the wall removed for insertion of equipment, lateral bracing also having been deleted to reveal panel sizes.

This is illustrated in FIG. 2, wherein stud 36c has been partially removed, eliminating its load bearing function. Because of the load distributing influence of the span cord 27, studs 36a, b and d, along with the remaining wall support structure receive the additional load which was being borne by stud 36c. This configuration permits removal of wall structure to provide openings such as equipment opening 37 which permits access to the interior of the cleanroom. This opening 37 can be formed within the wall support structure 20 without adversely affecting either the plenum assembly or remaining cleanroom assembly (other than temporary comprise of the cleanroom atmosphere). This structural design wherein at least one of the wall stud members 36 may be removed and later reinstalled even after the industrial structure has been assembled and certified offers the improved flexibility of modular construction which permits remodeling or structural modification to meet the changing conditions caused by new equipment and new procedures being developed within the electronics fabrication industry. Although a slight shift in load bearing distribution may occur, the nature of the structure distributes this load without causing a significant displacement or adverse weakening of the remaining industrial structure which would otherwise compromise cleanroom certification for the unmoved portion.

The use of a span cord to tie the plenum structure together with the wall support structure to develop distribution of plenum load, along with the modular construction of the wall structure, enables the cleanroom to be easily modified at each sidewall for insertion of equipment or change in room configuration. Instead of one service aisle, the present cleanroom structure is well adapted to have two or even all walls operate as service walls each with an accessing service aisle. Accordingly, cleanroom equipment can be installed around the perifery of this cleanroom, increasing the productive capacity of the room. This is enabled because the modular construction permits assembly or disassembly of each element of wall structure around the full perifery of the cleanroom enclosure. As manufacturing procedures change or new equipment becomes available to improve old procedures, installation of such equipment at various locations along the wall structure can be readily implemented. For example, the structure shown in FIG. 1 having two span cords 27 which tie the plenum and wall support structure together would allow placement of the service aisle at the opposing wall opposite the service wall adjacent to service aisle 12. Likewise, the remote wall at the back of FIG. 1 could serve as a service wall with adjacent service aisle.

To further strengthen the subject structure, seismic or diagonal bracing 38 is installed between wall support studs 36. Typically, such bracing is inserted at corner locations to give maximum rigidity to the structure and leave intermediate sections of the wall structure open for installation of service equipment as shown in FIG. 3. Such wall bracing 38 can be installed by bolting each brace in an opposing diagonal orientation in accordance with well-known construction methods. The removable installation of such diagonal bracing preserves the ability of modification of the wall structure around the full perimeter of the cleanroom.

Figure 4:
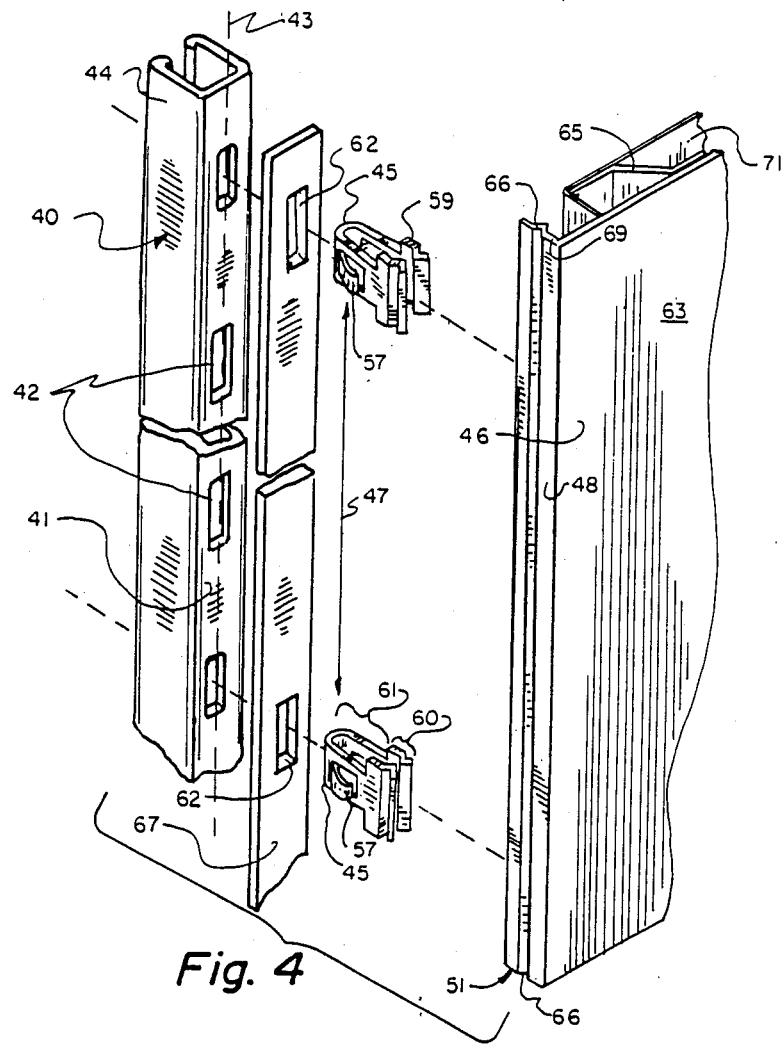
FIG. 4 illustrates an exploded view of the wall section taken along the lines 4—4 of FIG. 1.

One method of implementing the integrated, rigid construction between the plenum assembly 15 and the wall structure construction 16 involves the use of support studs such as is illustrated in FIG. 4. Each support stud 40 includes at least one face 41 having a column of equally spaced, slotted openings 42 which are in exact vertical alignment. The vertical alignment of these openings defines a vertical alignment reference 43 for each stud which serves to guide positioning of all other studs into a parallel relationship, based on mutual comparison of vertical alignment references as opposed to the side 44 or other exterior face structure of the wall stud.

The illustrated stud 40 is a Unistrut steel stud which includes openings 42 used in the prior art for passing electrical wiring or other structural accessories. The fact that the Unistrut stud had its column of openings in exact vertical alignment and equally spaced has not been applied as part of a method for unique construction of a cleanroom. In accordance with the present invention, however, it has been discovered that the use of a vertical alignment reference based on openings within the stud member can be utilized as a building element which offers unique modular construction within the unique requirements of a cleanroom structure, which is also capable of rapid assembly or disassembly when coupled with the use of an alignment jig and other assembly methods as will be discussed hereafter. In short, by disregarding prior practices of construction wherein vertical alignment and horizontal spacing between stud members were measured on the basis of stud facing or wall structure 44, the present invention disregards this practice and focuses solely on the alignment of the slotted openings 42. As used herein, term "slotted" has reference to an opening which is adapted to receive a clip 45 or other form of attachment means suitable for coupling wall panels to the stud structure. Such openings will typically be elongated, but may be of any geometric configuration which provides automatic positioning of the inserted clip 45 along the vertical reference 43.

The significance of the slotted opening and clip will be apparent in view of the illustrated modular construction which utilizes panels 46 which releasably attach to the wall stud 44 (36 in FIG. 1). By positioning the vertical alignment reference of each stud at equal separation distances from each adjacent stud (with the possible exception of studs positioned at corners and at door and window openings) a single panel width can be attached to all parts of the wall structure. Typically, room dimensions will be selected such that openings at corners and at door and window openings will also fall within the common separation distance to allow a single panel to be attached throughout the structure. The vertical height of the wall structure is selected to be equal to an exact multiple of the vertical distance of the common panel. Obviously, where structural limitations prevent the use of a single panel over all parts of the wall, standard panel sizes in smaller dimension can be utilized. Specific description of panel construction is provided hereafter.

Releasable attachment of the wall panels to the stud members is accomplished with the use of a plurality of panel clips 45 as previously noted. The panel clips are inserted at appropriate intervals 47 to ensure that at least two clips are mounted along each side 48 of the wall panel.

Figure 5:
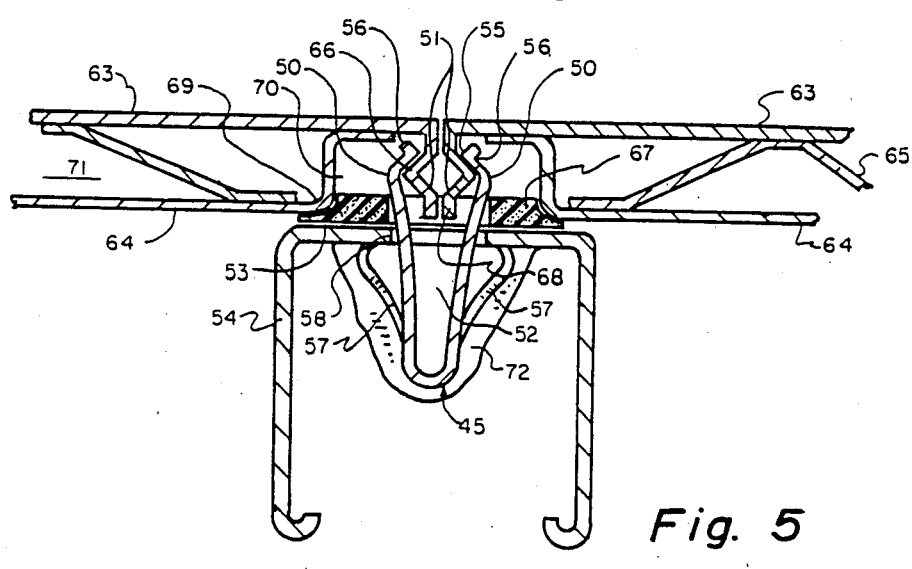
FIG. 5 illustrates a wall section taken along the lines 5—5 of FIG. 1.

One embodiment developed specifically for use in accordance with the vertical alignment reference aspect of this invention is illustrated in cross-section in FIG. 5. It includes opposing clip walls or winged members 50 which are biased by spring-tension into opposing contact or near contact in the absence of an inserted panel. These clip walls are shown in a distended configuration caused by the separation forces exerted by a pair of panel flanges 51. The space between the opposing clip walls 50 is identified as a vertical insert channel 52 which is oriented to project outward in perpendicular relationship to the face 53 of the stud member 54. In otherwords the clip comprises a pair of wing members 50 which form the opposing clip walls and which are spring-biased against each other in a U-shaped configuration to provide an open region within the U which comprises the vertical insert channel 52. This insert channel 52 includes a receiving channel positioned between a pair of diverging lips 55 which operate to guide the flange or lip 51 of the panel into the insert channel. Included with the lip 55 is an indented ridge 56 which also projects toward the insert channel to at least partially close off the opening of the U-configuration. When the panel flange or lip 51 is inserted within the U-channel, this indented ridge 56 imposes frictional contact to restrain the panel in its attached position. The clip structure includes a pair of laterally projecting, spring-biased fingers 57 which project to a width greater than the width of the slotted opening 58 into which the clip is inserted. As the clip is inserted into the opening, the spring-biased fingers recede toward the U-shaped channel and allow the body of the clip to pass through the opening. As the fingers 57 clear the opening, they immediately extend to lock the clip in place as shown in FIG. 5.

The spring-tension against the projecting fingers 57 is maintained by a shoulder section 59 which abuts against the face of the stud 41 to prevent further insertion of the clip within the opening 42. Accordingly, the inserted clip includes two parts—a projecting part extending forward of the stud face 41, including the forward portions 56 of the wing members 50, and an inserted part contained within the stud and through the slotted opening. Specifically, the projecting part extends from the shoulder 59 forward to the ends of the clip lip 56. The greater length of the shoulder section 59 and remaining structure of the projecting part 60 limit the degree of insertion of the clip within the opening 42.

The inserted part 61 is designed with a lesser length than the projecting part and is configured to assume proper orientation within the slotted opening. In the case of the eliptical openings shown in FIG. 4, the length of the inserted part 61 is slightly smaller than the longest diameter of the elliptical opening. Such dimension selection requires the lip to assume its proper vertical alignment in a centrally disposed position with respect to the vertical alignment reference.

The clip 45 provides a convenient means for attaching a panel or other removable wall covering while preserving the fully sealed construction required for cleanroom standards. A preferred panel for the present invention is disclosed in the figures. FIG. 1 shows the exterior face 63 of the panel in its releasably attached configuration to the wall support structure 20. This face is referred to as the exterior face because it forms the exterior surface of the wall structure which encloses the cleanroom area. The opposing face to the exterior face 63 is referred to as the interior panel face 64 because it is positioned and oriented toward the interior of the wall support structure 20. Typically, this interior panel face is substantially parallel and slightly displaced with respect to the exterior panel face by means of interior reinforcement spacer 65 coupled to the adjacent face of each of the opposing exterior and interior faces.

As has been previously indicated, the panel includes a periferal lip 51 formed around the perifery of the panel and at approximately 90 degrees with respect to the exterior panel face. This lip or flange is inserted into the clip channels 52 which have common alignment with the panel lip structure for removable attachment as wall covering. This panel lip 51 includes an indented periferal ridge 66 which is positioned in the panel lip such that an interior side of the panel lip 66 locks at an interior side of the indented ridge 56 of the clip to thereby restrain the panel and prevent unintentional removal from its attached position.

The use of such indented ridges 56 and 66 imposes a restraining force which urges the panel into tighter attachment at the stud face 41 or 53. This imposed force is significant because it cooperates with deformable, sponge-like tape 67 which provides a means for ceiling the perifery of each of the wall panels against airflow to thereby prevent access for foreign matter through the wall structure. It is clear from FIG. 5, that the distal ends 68 of the panel lips 66 are depressed into the foam tape insert 67. Such compressive contact establishes a barrier against air movement which might otherwise compromise cleanroom conditions.

This tape 67 is applied to the stud face 41 after insertion of the clips 45. Slots 62 are formed in the tape to permit the clip to project forward of the tape surface. A gel caulking 72 is coated over the inserted part of the clip 45 to prevent contamination from entering through the slot 62 in the tape.

To further seal the cleanroom against microcontamination, a second lip 69 is provided as part of the wall panel and is oriented in a common direction with the first lip and in close proximity to define a channel 70 therebetween, with the two lips 51 and 69 forming opposing channel walls. The second lip 69 is coupled to the interior panel face 64 to form a continuous interior surface, the second lip fully circumscribing the perimeter of the interior panel face and enclosing the space between the exterior 63 and interior 64 faces to create a dead space 71 therein. This dead space improves both sound and temperature insulation for the cleanroom enclosure.

Sealing contact for a second barrier against microcontamination is accomplished by extending the foam seal 67 across the face 53 of the stud such that the second lip 69 is also drawn into sealing contact thereat. In otherwords, the juncture of the interior face 64 and second lip 69 forms a shoulder which extends from the exterior panel face approximately the same distance as the end 68 of the first lip 51. The deformable seal 67 is accordingly contacted and compressed by both the first lip 68 and the shoulder of the second lip 69. The inventor has discovered that surprising improvement results in cleanroom performance by incorporating a double barrier against entry of microcontaminant particles through the contacting pair of lips and deformable materials.

To further assure complete absence of dust particles and other forms of microcontamination, all interior wall structure is formed of the releasable panels as outlined herein. Typically, such panels will be constructed of sheet metal which has been found to be particularly suitable for cleanroom applications. Such panels do not generate due and can be treated to protect exposed surfaces to cleanroom chemicals. The panels shown in the figures include a reinforcement section or spacer 65 which is formed in a trapezoidal, corrugated configuration and is bonded between the opposing exterior and interior faces of the panel. The modular construction and unique components of the present invention enable rapid assembly of a cleanroom wall which is totally formed of clip-on panels. The panels are easily adjusted to co-planar arrangement as shown in FIG. 5, the respective contiguous lips 51 of adjacent panels being placed in direct contact to form a planar wall surface 63. A space is illustrated between the contiguous lips only for purpose of drawing illustration. In real construction, no space exists between panel faces.

To permit visual observation of work within the cleanroom, transparent window panels 73 can be substituted for the standard wall panel. The window panel includes a visually transparent window section 74 with a rigid metal frame 75 which enables emplacement at any location where a wall panel could likewise be inserted. The transparent section 74 is coupled to the panel frame 75 without a mullion or without any other form of projecting structure which would otherwise create turbulance in the laminar air flow at the window section surface within the cleanroom enclosure.

As part of the enclosing wall structure, the cleanroom includes perforated grid panels 76 for venting air from the cleanroom. This exhaust or venting means is required to enable continuous circulation of clean air from the plenum. By positioning the venting grid panels near the floor, a counterflow or inadvertent entry of contamination will not adversely affect the operating areas in the cleanroom area. Typically, such operating areas include work tables or other working areas which are substantially raised above floor level to prevent contamination. In some instances, the floor itself may be perferated to allow air flow directly therethrough.

Various types of floor surfaces may be suitable for cleanroom environments and need not be further discussed in this description. The floor surface selected should obviously be rigidly attached to the cleanroom structure and appropriately designed to preserve the cleanroom environment.

As has been previously noted, one of the major advantages of the present invention is the ability to assemble, disassemble and reassemble the modular structure with substantial ease. This simplicity of construction has been developed despite the critical need that each corner, each abutting panel, all openings and all support structure must be maintained in a tight, integrated fit which will preclude entry of microcontamination. Even more significant, the structure permits disassembly or modification by removal of sections of wall without disturbing the tight, integrated fit of the remaining cleanroom structure. The modular adaptability of this cleanroom assembly extend even to the point that the structure can be disassembled and reassembled into a second cleanroom configuration different to that of the first structure, using the very component materials of the first structure. This is a direct contrast to prior art cleanroom construction wherein the structure was permanent and not easily adapted to change.

Figure 6:
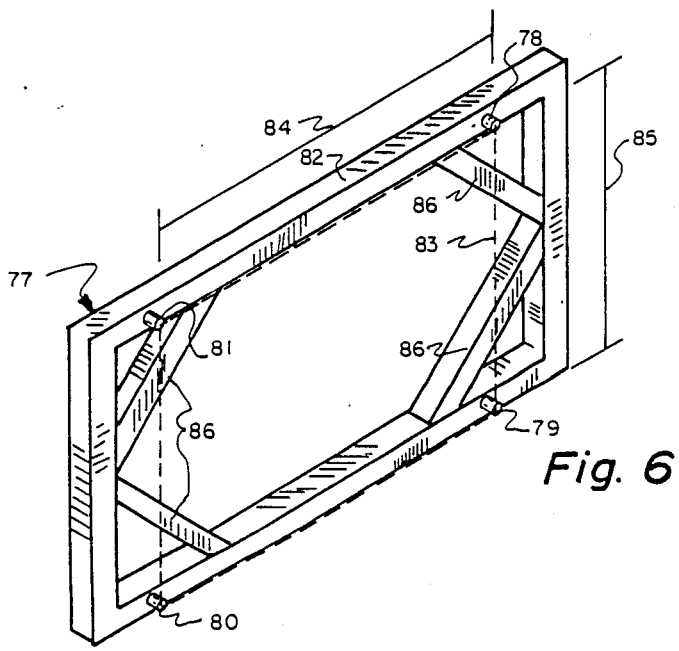
FIG. 6 depicts an assembly jig for constructing the subject cleanroom.

The rapid assembly of this construction is further facilitated by use of an alignment jig 77 illustrated in FIG. 6. The alignment or assembly jig 77 includes four projecting fingers 78, 79, 80 and 81 rigidly fixed to a frame 82. These fingers are positioned at corners of a rectangle 83, thereby ensuring the parallel nature of lines respectively intercepting fingers 78, 79 and 80, 81. The spacial separation 84 between finger pairs 78, 79 and 80, 81 is exactly equal to the desired separation distance between vertical alignment references of adjacent wall studs. This distance will correspond to the exact width of wall panels to be inserted with respect to the vertical alignment references. The vertical separation between finger pairs 78, 81 and 79, 80 is equal to an integral multiplier times the distance of separation between adjacent slotted openings in the support studs. This vertical separation ensures that each pair of fingers 78, 79 and 80, 81 can simultaneously be inserted into a single pair of slotted openings in a support stud. These fingers are dimensioned to slide snuggly into the slotted openings, thereby eliminating any substantial movement or play in a stud which is attached to the alignment jig. Braces 86 are provided to ensure that the framework remains sturdy and rigid, despite substantial strain that might be applied.

The assembly jig 77 is utilized during initial construction to quickly assemble the wall support structure 20. FIG. 2, for example, illustrates the use of the jig 77 in its attached configuration to studs 36a and 36c. Whether applied in original construction or mere structural modification, the jig 77 would be inserted into slotted openings of the wall studs to provide exact parallel alignment of their respective vertical alignment references. In addition to ensuring that their respective columns of slotted openings are in exact alignment, the jig further provides horizontal alignment to ensure proper plumb relationship. Applying the jig during construction enables rapid assembly by starting with a single stud in a proper vertical position, and then automatically positioning each successive stud with respect to the original properly aligned stud.

By using this method, wall studs are positioned in vertical alignment based on alignment of their slotted openings, basically disregarding the actual horizontal and vertical alignment of wall faces or surface structure. This procedure enables the total wall support structure to be tied tightly together because of exact alignment of corners and edges of wall panels which are attached by means of clips to the stud openings. The same assembly jig can be used to align full length vertical wall studs which provide support or means for suspending the support grid, including span cord 27, above the floor location where the room is to be assembled. As shown in the figures, the plenum side support studs 25 may be easily aligned with the wall studs 36 below use of the alignment jig 77. This enables the use of common wall panels for attachment as cleanroom enclosure structure, as well as plenum enclosure structure. If the plenum attachment matrix formed by the support grid and side plenum support studs is likewise constructed of studs having a column of slotted openings in exact alignment for defining an alignment reference, panel members can be used to provide the top cover for the plenum as well. This method of construction enables the use of panel clips, panel covers and the referenced assembly jig to quickly and accurately align and install all wall support studs, plenum support studs and top cover studs with attachment of panels thereto. The method of construction and components to be used would correlate to those methods and components previously discussed for wall structure assembly. Based on common principles of construction, it will be noted that the plenum side wall studs and cleanroom support wall studs may either be a single stud extending from floor level to the support grid, or may be component studs coupled in common alignment. Either form of structure provides a proper distribution of forces from the span cord into the wall structure of both the plenum and cleanroom areas.

Although no discussion has been given regarding means for entry to the cleanrom enclosure, it will be apparent to those skilled in the art that a doorframe can be inserted into the wall support structure in the same manner that equipment access openings such as Item 37 may be positioned therein. Typically, such entryways will be located away from service aisles and will include means for restricting contaminant flow into the cleanroom area. Such a door opening could be formed by two vertical wall studs and one horizontal stud coupled across the two vertical studs to form the doorframe. The vertical studs would each have a column of slotted openings in exact alignment to form vertical references in parallel orientation with the remaining wall studs. The horizontal stud would likewise have a column of slotted openings in exact alignment to form a horizontal alignment reference parallel with other horizontal references in the wall structure. The orientation of these vertical and horizontal references enable rapid attachment of wall panels in exact alignment to provide tight corners and abutting surfaces which can readily be sealed by the methods disclosed herein. If the door dimension is of standard width, an assembly jig similar to that shown in Item 77 can be constructed to provide exact alignment between the opposing door jam studs.

Modification of the subject cleanroom can be quickly accomplished by releasing the appropriate panels from the wall structure. This may be accomplished by use of suction cup handles which are attached at the exterior surface 64 of panel. After releasing the panels from the clips mounted within the wall studs, wall stud structure may be removed and appropriate cross-member reinforcement 87 inserted to frame the modified opening. Such modifications are absent load distortions because the total load of the plenum structure is distributed throughout the remaining wall structure. Following insertion and sealing of equipment (Items 13 and 14), panel inserts are replaced by pulling panels into locked position at interior wall clips using suction handles. The total modification procedure can be conducted from the service aisle without entry into the cleanroom interior. Once the periferal openings which develop during the modification are sealed and certified, cleanroom operation is immediately restored. No further certification of other structural components removed from the area of modification is required.

It will be apparent to those skilled in the art that numerous modifications to the methods and components set forth herein are feasible. Accordingly, it is to be understood that the scope of this invention is not to be limited by examples set forth herein, but shall be limited only by the following claims.

I claim:

1. An industrial cleanroom structure and enclosure wherein particulate microcontamination greater in size than 0.5 microns within the cleanroom enclosure is maintained at or below a concentration level of approximately 100 particles per cubic foot, the cleanroom having at least one service wall adjacent to an exterior service aisle which is adapted for mounting of industrial equipment with its operational side within the cleanroom and its maintenance side exposed to the service aisle outside the cleanroom, said structure comprising:

a. a plenum enclosure positioned above the cleanroom enclosure and formed between top, bottom and side wall covers, the bottom cover including a microfilter system which communicates to the cleanroom enclosure and filters out microcontamination from air being expelled through the filter system into the cleanroom from the plenum;

said plenum including support structure rigidly attached to the top and bottom covers and to the side walls to fix the respective side walls and covers in relative immovable position around the plenum enclosure, said covers and side walls being sealed to prevent entry of microcontamination;

said plenum structure further including at least one opening for receiving air therein and means communicating therewith for forcing air into the plenum enclosure;

b. a plurality of fabricated wall studs removably attached to the plenum support structure in vertical orientation to form wall support structure below the plenum and around the cleanroom enclosure, the wall support structure including a plurality of removable horizontal braces between each respective pair of wall studs to fix their relative position and provide lateral distribution of load into coupled wall studs;

c. said industrial structure further comprising at least one horizontal span cord coupled to the plenum support structure adjacent the service aisle, the wall structure adjacent the service aisle also having each of its studs structurally coupled to the span cord to rigidly tie all of the coupled studs together as load sharing stud members, said load being transfered and distributed from the plenum support structure through the span cord and into the respective stud members, each stud having sufficient column strength to support its own distributed portion of the plenum load, as well as that portion of the load normally distributed to two adjacent studs when all wall studs are in place;

d. said wall structure adjacent the service aisle being capable of having at least one of the stud members removed and later reinstalled at any time after the industrial structure has been assembled and certified as cleanroom structure without causing a displacement or adverse weakening of the remaining industrial structure which would compromise cleanroom certification of the unmoved structure;

e. said wall support structure including wall panels having an exterior face and means for releasable attachment of the panel to the wall support structure to fully enclose the cleanroom with the exterior face exposed to the cleanroom enclosure, and further including means for sealing each panel at its perifery to prevent entry of microcontamination therethrough;

f. said panels being attached to the stud members adjacent the service aisle and being adapted in size and configuration to allow removal and reinsertion or replacement with other panels to provide a tight periferal fit adapted for sealing between the attached panels and any equipment penetrating the cleanroom structure from the service aisle;

g. means for venting air from the cleanroom to enable continuous circulation of clean air from the plenum, said venting means being positioned near the floor of the cleanroom and extending periferally around the cleanroom; and h. a floor surface attached to the industrial structure as part of the cleanroom environment.

2. An industrial structure as defined in claim 1 wherein the plenum support structure is formed of a plurality of horizontal, parallel, elongated support members attached to and joined together by at least two horizontal span cords positioned perpendicular to and near opposing sides of the elongated support members to form an overhead support grid for attachment of the top cover;

a plurality of side panel support studs being coupled vertically to the support grid at its perifery to form a side wall plenum support grid, said elongated support members and attached panel support studs being positioned at equidistant locations along common lateral directions for receiving removable panels which comprise the top and side wall covers;

attachment means coupled to the overhead support grid and panel support studs for releasable attachment of panels thereto;

a plurality of plenum cover panels of generally equivalent dimensions removably attached to the overhead and side support grids and comprising the respective top and side covers;

means for suspending the support grid in horizontal, fixed position at a desired location above floor level.

3. An industrial structure as defined in claim 2, wherein the bottom cover comprises a plurality of ceiling support members cross attached and configured to support a HEPA filter system, the ceiling support members being suspended from the support grid and including ceiling filter insert members attached to the ceiling support members and including means for sealing the perifery of each insert member to prevent entry of air from the plenum into the cleanroom enclosure except by way of the HEPA filter system.

4. An industrial structure as defined in claim 1, wherein two service aisles exist at opposing exterior sides of the cleanroom, each of said service aisles providing access to an exterior side of the wall support structure;

said industrial structure including two horizontal span cords coupled to the plenum support structure adjacent each service aisle, the wall structure adjacent each service aisle also having each of its studs structurally coupled to the span cord to rigidly tie all of the coupled studs together as load sharing stud members, said load being transferred and distributed from the plenum support structure through the respective span cords and into the respective stud members, each stud having sufficient column strength to support its own distributed portion of the plenum load, as well as that portion of the load normally distributed to two adjacent studs when all wall studs are in place;

said wall structure adjacent the service aisle being coupled or having at least one of the load bearing stud members removed and later installed at any time after the industrial structure has been assembled and certified as cleanroom structure without causing a displacement or adverse weakening of the remaining industrial structure which would compromise cleanroom certification of the unmoved structure.

5. An industrial structure as defined in claim 2 wherein the plenum side panel support studs are in vertical alignment with and are coupled to the wall studs of the cleanroom, the span cord being vertically above the wall studs in fixed relation with the overhead grid and plenum side panel support studs, the span cord providing for transfer and distribution of weight associated with the plenum structure into all of the vertical support studs.

6. An industrial structure as defined in claim 1, further comprising a column of diagonal braces removably attached to and transversing between a single pair of wall studs from floor to plenum level at each side of the structure, thereby reinforcing vertical and lateral stability of the wall support structure.

7. An industrial room as defined in claim 4 wherein service aisles exist on each side of the cleanroom, each of said service aisles providing access to an exterior side of the wall support structure;

said industrial structure including at least two horizontal span cords respectively coupled to the plenum support structure at approximate perpendicular orientation to support members of the horizontal plenum support structure adjacent the service aisles, the wall structure adjacent each service aisle also having each of its studs structurally coupled together as load sharing stud members, said load being transferred and distributed from the plenum support structure through the respective span cords and into the respective stud members, each having sufficient column strength to support its own distributed portion of the plenum load, as well as that portion of the load normally distributed to two adjacent studs when all wall studs are in place;

all wall structure adjacent the service aisles being capable of having at least one of the load bearing stud members and attached horizontal braces removed and later reinstalled at any time after the industrial structure has been assembled and certified as cleanroom structure without causing a displacement or adverse weakening of the remaining industrial structure which would compromise cleanroom certification of the unmoved structure.

8. An industrial structure as defined in claim 7 wherein each wall stud and brace forming wall support structure around the total perifery of the cleanroom enclosure may be individually and serially disassembled and then replaced to its attached stud members to enable emplacement of service equipment into the cleanroom interior at any position around the perifery of the cleanroom without causing a displacement or adverse weakening of the remaining industrial structure which would compromise cleanroom certification of the unmoved structure, provided that no more than three wall studs are concurrently removed at any one side of the structure.

9. An industrial structure as defined in claim 1 wherein each of said support studs includes at least one face having a column of equally spaced, slotted openings in exact vertical alignment for defining a vertical alignment reference for that stud which is parallel to other similar stud vertical alignment references.

10. An industrial structure as defined in claim 9, wherein the vertical alignment references of wall studs with the exception of studs positioned at corners and at door and window openings, have equal separation distances therebetween and are in exact parallel vertical orientation.

11. An industrial structure as defined in claim 9 wherein the means for releaseable attachment of the wall panels comprises a plurality of panel clips inserted into a plurality of the slotted openings of each wall stud, each clip having means for retaining the inserted position and further including a vertical insert channel formed between opposing clip walls which are biased by spring tension into opposing contact or near contact, said channels projecting outward perpendicular to the face to which the clip is mounted to provide a clip-attachment location for flanged portions of wall panels; said slotted openings including means to align the insert channel along the vertical reference.

12. An industrial structure as defined in claim 11, wherein the wall panels have equal width dimensions, except for panels used at corner junctions and window/door openings, corresponding to the separation distance between adjacent alignment references of support studs, said panels comprising a panel face with a periferal lip formed around the perifery of the panel and at approximately ninety degrees with repsect to the face; said panel lip being inserted into clip channels having common alignment with panel lip structure and the vertical reference for removable attachment as part of the wall structure.

13. An industrial structure as defined in claim 11, wherein the panel clips comprise a pair of wing members spring biased against each other in a U-shaped configuration wherein the open region of the U comprises the vertical insert channel, said clip having a lip diverging away from the insert channel at each wing edge to define a receiving channel for guiding the lip of the panel into the insert channel.

14. An industrial structure as defined in claim 13 wherein the means for retaining the inserted position of the clip within the stud comprises a pair of laterally projecting, spring-biased fingers which project to a width greater than the width of the slotted opening and which can be depressed to recede into the insert channel during emplacement of the clip in the opening, but which springs toward the full projection width upon passing through the slotted opening in the stud.

15. An industrial structure as defined in claim 1 wherein the panels enclosing the cleanroom include a visually transparent window section with a rigid metal frame section which enables emplacement at any locations where a wall panel can be inserted, said transparent section being coupled to the panel frame section without a mullion or other form of projecting structure which would create turbulence in air flow at the window section.

16. An industrial structure as defined in claim 1 wherein all elements of the structure are modular and can be disassembled and reassembled into a second cleanroom structure of different configuration than that of the first structure.

17. An industrial structure as defined in claim 9, further comprising an assembly jig which includes four projecting fingers rigidly fixed to a frame and being exactly positioned at corners of a rectangle, said fingers being horizontally separated by a distance exactly equal to the desired separation distance between vertical alignment references of adjacent wall studs, the fingers being separated vertically by an integral multiplier of the equal distances between adjacent slotted openings in the studs, said fingers being shaped to slide snugly into at least two slotted openings on each of two adjacent wall studs, thereby aligning the vertical reference of each stud into exact parallel and plumb relationship matching the separation distance between two sides of the rectangle, said jig being inserted on wall studs of the structure.

18. An industrial structure as defined in claim 11, wherein the panels include a second lip projecting in a common direction with the first lip and in close proximity to define a channel therebetween with the two lips forming opposing channel walls;
said means for sealing the perifery of each panel comprising a deformable material which is positioned against an adjacent surface of the stud or support member to which the panel is attached and which has sufficient depth to make sealing contact with both projecting lips of the panel to thereby establish a double barrier against entry of microcontaminant particles through the contacting pair of lips and deformable material.

19. An industrial structure as defined in claim 18, wherein the second lip is formed as an interior channel wall which is joined to an interior panel face substantially parallel and slightly displaced with respect to the exterior panel face, said second lip fully circumscribing the perimeter of the interior panel face and enclosing the space between the exterior and interior faces to create a dead space therein.

20. An industrial structure as defined in claim 19, wherein the juncture of the interior face of the panel and the interior channel wall forms a shoulder which extends from the exterior panel face approximately the same distance as the first lip, said deformable sealing material extending across the adjacent surface of the contacted stud to establish a first seal between the first lip and the sealing material and a second seal between the material and the shoulder of the second lip.

21. An industrial structure as defined in claim 19, wherein the panel is contructed of sheet metal and includes a corragated sheet of metal of uniform thickness between opposing peaks, said opposing peaks being bonded to the opposing exterior and interior faces of the panel to space apart and reinforce the respective panel faces.

22. A cleanroom as defined in claim 3 wherein the vertical panel support studs which extend from the floor to the overhead support grid also form the wall studs which are positioned at corners of the cleanroom structure.

23. A cleanroom as defined in claim 1 wherein the wall studs positioned at corners of the cleanroom structure also form the means for suspending the support grid.

24. A cleanroom as defined in claim 1, wherein wall surface structure of the inside wall consists only of removable panels which have been positioned on panel clips and which may be removed and repositioned at will.

25. A portable, industrial, cleanroom having side walls, a floor and a ceiling defining a room enclosure and further including a closed, superior plenum for delivering air flow through the ceiling into the enclosure and being useful as a clean room wherein dust content and other foreign matter greater than 0.5 micrometer in size may be maintained at or below a concentration level of approximately 100 particles per one cubic foot, said room enclosure comprising:

a plurality of elongated support members joined together to form an overhead support grid for attachment of enclosing structure for the cleanroom therebelow, said support grid including at least one span cord rigidly joined to all other support members to distribute load throughout the support grid;

means for supporting the support grid in horizontal, fixed position at a desired location above floor level;

a plurality of panel support studs coupled to the support grid to form a top cover and side wall plenum attachment matrix wherein panel support studs are positioned at equidistant locations along common lateral directions for receiving removable panels which enclose a plenum volume which extends substantially across the ceiling and below the support grid;

said support grid being further adapted with means for attachment of an air circulating fan, said plenum attachment matrix including an air intake opening communicating into the plenum volume to permit air to be directed from the fan into the plenum;

a plurality of plenum cover panels of generally equivalent dimensions removably attached to the matrix to fully enclose the top and sides of the plenum volume, except for the air intake;

a plurality of ceiling support members cross attached and configured to support a HEPA filter suspended ceiling and being coupled to the support grid or plenum matrix to position the suspended ceiling at a desired ceiling height;

ceiling filter insert members attached to the ceiling support members and including means for sealing the perifery of each insert member to prevent air passage from the plenum into the room enclosure except by way of the HEPA filter system, the ceiling perimeter and plenum matrix with attached panels collectively defining the plenum volume and being respectively sealed to prevent entry of contaminated air;

a plurality of fabricated wall studs, each stud including a panel attachment face having a column of equally spaced, slotted openings in exact alignment for defining a vertical alignment reference;

each stud being attached at a top end to the ceiling support members or directly to the support grid and having its vertical alignment reference positioned at an equal separation distance with respect to adjacent studs, with the exception of corner junctions and window/door inserts, and in parallel vertical orientation with vertical alignment references of all other wall studs;

a plurality of panel clips inserted into a plurality of the slotted openings of each wall stud, each clip having means for retaining the inserted position and further including a vertical insert channel formed between opposing clip walls which are biased by spring tension into opposing contact or near contact, said channels being aligned with the alignment reference for the attached stud and projecting outward perpendicular to the face to which the clip is mounted to provide a clip attachment location for flanged portions of wall panels;

a plurality of wall panels having width dimensions except for panels used at corner junctions and window, door and equipment openings, equal to the separation distance between adjacent alignment references of support studs, said panels comprising a panel face with a periferal lip formed around the perifery of the panel and at approximately ninety degrees with respect to the face; said panel lip being inserted into clip channels having common alignment with panel lip structure for removable attachment as part of the wall structure;

means for sealing the perifery of each of the wall panels against air flow to thereby prevent access for foreign matter through wall structure;

a floor surface associated with the cleanroom structure; and means for entering and leaving the room enclosure without compromising the cleanroom condition.

26. A cleanroom as defined in claim 25, wherein the overhead support grid comprises a plurality of parallel, overhead, support members joined together by a pair of perpendicular span cords rigidly affixed at opposing ends of the support members to form a rectangular support perimeter for suspending the wall structure therebelow, and to form for the fan attachment means.

27. A cleanroom as defined in claim 25, wherein the means for suspending the support grid comprises vertical panel support studs which are attached to the support grid and which extend to the floor, each of said support studs including at least one face having a column of slotted openings in exact vertical alignment for defining the vertical alignment reference for that stud which is parallel to the remaining stud vertical alignment references.

28. A cleanroom as defined in claim 25, wherein the plenum attachment matrix comprises a top covering including top support studs, each having a column of slotted openings in exact alignment for defining a top cover alignment reference, which reference is parallel to the remaining top cover references;

a plurality of panel clips inserted into a plurality of the slotted openings of each top support stud, each clip having means for retaining the inserted position and further including a vertical insert channel formed along the reference and between opposing clip walls which are biased by spring tension into opposing contact or near contact, said channels projecting outward perpendicular to the face to which the clip is mounted to provide a clip-attachment location for flanged portions of top panels;

a plurality of top cover panels having width dimensions except for panels used at corner junctions and intake openings, equal to the separation distance between adjacent top support studs, said panels comprising a panel face with a periferal lip formed around the perifery of the panel and at approximately ninety degrees with respect to the face;

said panel lip being inserted into the clip channels along common alignment references for removable attachment as part of the plenum top cover;

said plenum cover matrix further including side panel support studs equidistantly placed to form side support covers suspended below the perimeter, each side stud having a column of slotted openings in exact alignment for defining a side plenum cover alignment reference, which reference is parallel to the remaining side cover references;

a plurality of panel clips inserted into a plurality of the slotted openings of each side cover stud, each clip having means for retaining the inserted position and further including a vertical insert channel formed along the reference and between opposing clip walls which are biased by spring tension into opposing contact or near contact, said channels projecting outward perpendicular to the face to which the clip is mounted to provide a clip-attachment location for flanged portions of top panels;

a plurality of side cover panels having width dimensions, except for panels at corner junctions, equal to the separation distance between adjacent alignment references of side cover studs, said panels comprising a panel face with a periferal lip formed around the perifery of the panel and at approximately ninety degrees with respect to the face;

said panel lip being inserted into the clip channels along common alignment references for removable attachment as part of the plenum side cover; said plenum volume being fully enclosed by the top cover and four side covers, the bottom of the plenum being closed by the ceiling of the cleanroom.

29. A cleanroom as defined in claim 28 wherein the wall studs are coupled in vertical alignment with the plenum side panel support studs such that the respective vertical alignment references of the coupled studs are in exact common alignment, thereby aligning the panel clips positioned in the respective slotted openings and the attached panels.

30. A cleanroom as defined in claim 25, wherein the panel clips comprise a pair of wing members spring biased against each other in a U-shaped configuration wherein the open space within the U comprises the vertical insert channel, said clip having a distal lip diverging away from the insert channel at each wing edge to define a receiving channel for guiding the lip of the panel into the insert channel.

31. A cleanroom as defined in claim 30 wherein the means for retaining the inserted position of the clip within the stud comprises a pair of laterally projecting, spring-biased fingers which project to a width greater than the width of the slotted opening into which the clip is inserted and which can be depressed to recede into the insert channel during emplacement of the clip in the opening, but which springs toward the full projection width upon passing through the slotted opening in the stud, said fingers including means for biasing the clip in the inserted position.

32. A cleanroom as defined in claim 31 wherein the clips comprise a projecting part and an inserted part, the projecting part including the forward portions of the wing members extending from the distal lip to a shoulder section which abutts against the face of the stud, the lip forming the forward portion of the clip, the shoulder forming the back portion of the projecting part, and the lateral edges between the lip and shoulder forming the opposing sides, said shoulder section having greater length from side to side than the length of the slotted opening; the inserted part of the clip having a lesser length than the length of the slotted opening and being centrally disposed with respect to the projecting part to thereby permit insertion thereof within the opening with exposed shoulders at each side which are adapted to abutt against the stud face and block further insertion into the opening.

33. A cleanroom as defined in claim 32, wherein the slotted opening is elliptical in configuration, the length of the inserted part being selected for a tight fit of the clip within the opening along the longest diameter of the elliptical configuration and in alignment with the vertical reference.

34. A cleanroom as defined in claim 32, wherein the laterally projecting fingers are formed from that part of the wing member which is the inserted part of the clip, the fingers being spring-biased against adjacent sides of the ellipitical opening and from within the stud structure.

35. A cleanroom as defined in claim 30 wherein the lip of the clip further comprises an indented ridge which projects toward the insert channel to at least partially close off the opening of the U and impose frictional contact at the flanged lip of the inserted panel to thereby restrain the panel in its attached position.

36. A cleanroom as defined in claim 35, wherein the lip of the panel includes an indented periferal ridge positioned in the panel lip such that an interior side of the indented ridge of the clip locks at an interior side of the indented ridge of the panel lip to restrain the panel against unintentional removal from its attached position.

37. A cleanroom as defined in claim 25 wherein the wall panels are attached to each panel clip in co-planar pairs, the respective contiguous lips of adjacent panels being placed in direct contact forming a planar wall surface and being inserted into a single insert channel to form a tight fitting wall structure.

38. A cleanroom as defined in claim 25, wherein at least two cleanrooms are positioned side-by-side with a common wall therebetween, each room sharing a common plenum formed above their respective ceilings and within four side plenum coverings and a single top plenum cover.

39. A cleanroom as defined in claim 25, wherein the means for entering and leaving comprises a door opening formed of two vertical wall studs and one horizontal stud coupled across the top of the two vertical studs to form a door frame, the vertical studs each having a column of slotted openings in exact alignment to form vertical references in parallel orientation with the vertical references of the remaining wall studs, the horizontal stud having a column of slotted openings in exact alignment to form a horizontal alignment reference parallel with the other horizontal references, said entry means further comprising a door hung tightly within the door frame and adapted with means for minimizing breach of the cleanroom conditions.

40. An industrial structure as defined in claim 25 wherein the panels enclosing the cleanroom include a visual transparent window section with a rigid metal frame section which enables emplacement at any locations where a wall panel can be inserted, said transparent section being coupled to the panel frame section without a mullion or other form of projecting structure which would create turbulence in air flow at the window section.

41. An industrial structure as defined in claim 25, further comprising an assembly jig which includes four projecting fingers rigidly fixed to a frame and being exactly positioned at corners of a rectangle, said fingers being horizontally separated by a distance exactly equal to the desired separation distance between vertical alignment references of adjacent wall studs, the fingers being separated vertically by an integral multiplier of the equal distances between adjacent slotted openings in the studs, said fingers being shaped to slide snugly into at least two slotted openings on each of two adjacent wall studs, thereby aligning the vertical reference of each stud into exact parallel and plumb relationship matching the separation distance between two sides of the rectangle, said jig being inserted on wall studs of the structure.

* * * * *